No. 717,752. PATENTED JAN. 6, 1903.
C. KOEGEL.
MILL TRUCK.
APPLICATION FILED DEC. 21, 1901.
NO MODEL.

Witnesses:

Inventor:
Charles Koegel
by Chapin & Lee
Attorneys.

UNITED STATES PATENT OFFICE.

CHARLES KOEGEL, OF HOLYOKE, MASSACHUSETTS.

MILL-TRUCK.

SPECIFICATION forming part of Letters Patent No. 717,752, dated January 6, 1903.

Application filed December 21, 1901. Serial No. 86,788. (No model.)

*To all whom it may concern:*

Be it known that I, CHARLES KOEGEL, a citizen of the United States of America, residing at Holyoke, in the county of Hampden and State of Massachusetts, have invented new and useful Improvements in Mill-Trucks, of which the following is a specification.

This invention relates to mill-truck construction, the object of the invention being to provide a truck of this character capable of sustaining a heavy load and easily operable when loaded, the invention being directed mainly to the construction of the forward axle and fifth-wheel and tongue construction, one of the main objects being to provide a tongue which is removable when swung to a certain vertical position, but which is firmly supported in said removable position.

Figure 1:
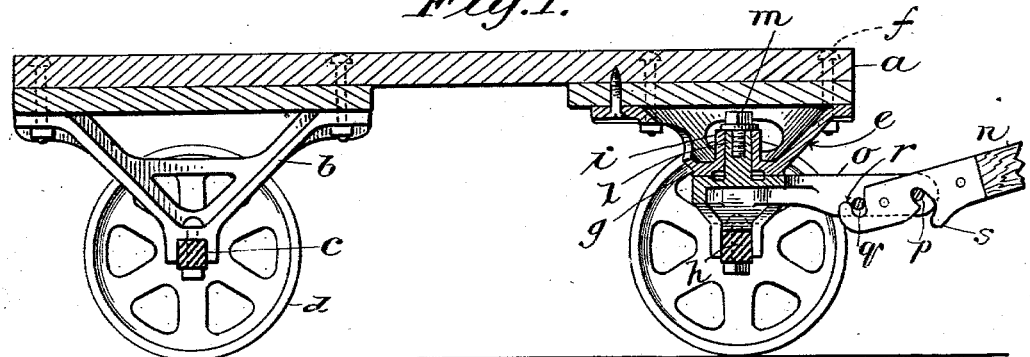
Figure 2:
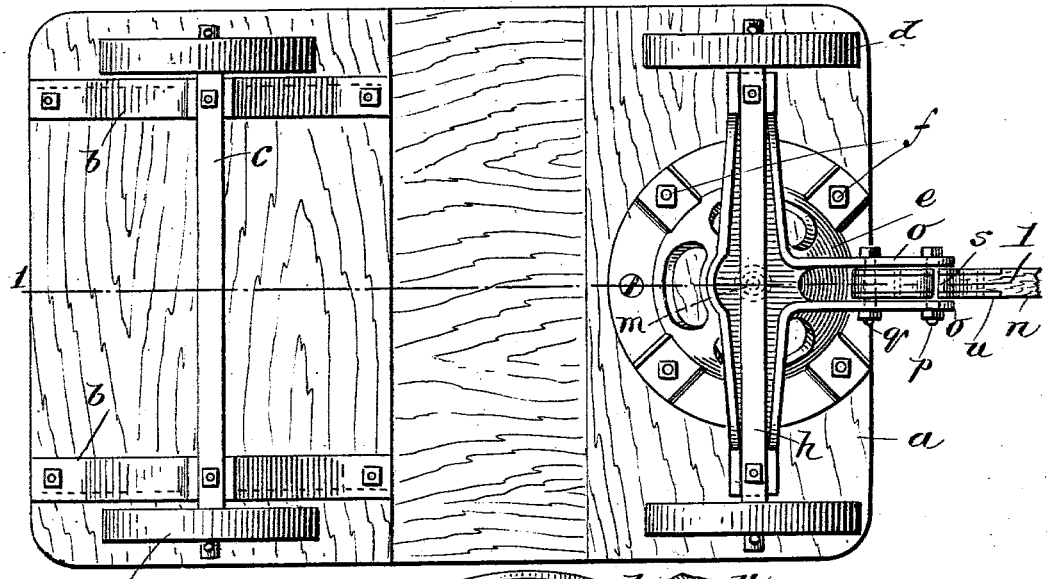
Figure 3:
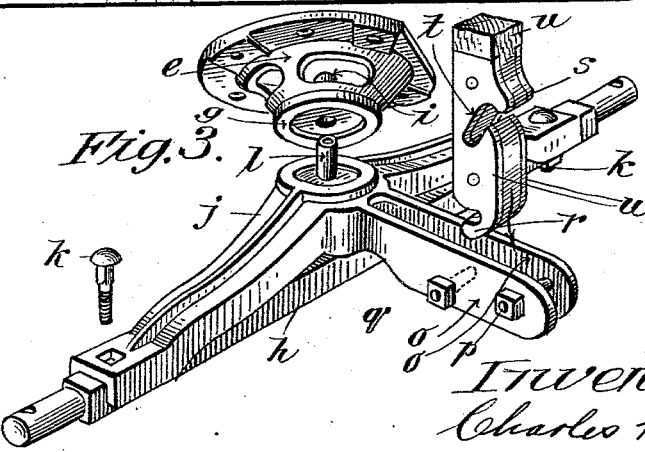

In the drawings forming part of this specification, Figure 1 is a sectional elevation of a truck constructed according to my invention. Fig. 2 is a bottom plan view of the same. Fig. 3 shows the forward-axle construction, the fifth-wheel construction, and the lower end of the tongue separated from the other parts.

Referring to the drawings, $a$ may indicate the usual truck-platform, at the rear end and beneath which suitable rear-axle brackets $b$ are bolted, one near each side, which brackets receive the axle $c$ in suitable recesses in their lower ends, said axle preferably being bolted to these brackets, the wheels $d$ turning on the axle.

The forward end of the truck has secured to the under side thereof in a substantially central position one member $e$ of the fifth-wheel construction, which consists of an inverted truncated cone provided with a flange, whereby, by means of the bolts $f$, it may be secured rigidly to the truck-platform. This construction, as shown in Fig. 3, provides an annular bearing-surface $g$, on which the forward axle $h$ may swing.

Axially of the member $e$ and extending substantially from the plane of the bearing-surface $g$ toward the base of the cone there is cast or secured a sleeve $i$. The front axle $h$ is provided with a truss-shaped saddle $j$, having socketed extremities extending nearly out to the bearing ends of the axle, at which point bolts $k$, passing through the said saddle and axle, secure the two together. The center of this saddle or truss has cast thereon an annular bearing-surface similar to the surface $g$ and adapted to bear on the latter, and centrally of this surface there is cast a stud $l$, which is adapted to enter the sleeve $i$, before referred to, this stud constituting the king-pin of the truck. To retain these fifth-wheel parts in their proper relation, a bolt $m$ is screwed into the end of the king-pin $l$ against a washer of somewhat larger diameter than the king-pin $l$, adapted to bear on the end of the sleeve, whereby the parts are pivotally secured together. This provides an exceedingly strong front axle and fifth-wheel construction. At the central point on the saddle there is provided a suitable socket for receiving the tongue $n$ of the truck, which consists of two plates $o$, preferably cast integral with said saddle and separated from each other by a little more than the thickness of the tongue. These plates extend horizontally outward from the center of the saddle toward the front of the truck. There are two bolts $p$ and $q$ passing transversely through the plates $o$, the bolt $p$ extending therethrough near the outer ends of said plates and the bolt $q$ extending therethrough farther back toward the saddle and in a little lower plane than the bolt $p$. The distance between these two bolts is sufficient to allow the tongue to be slipped down between them when it is held in a vertical position. The lower end of the tongue $n$ is constructed to adapt it to engage with said bolts when it is swung down to a substantially horizontal position and to freely swing on one of said bolts when it is swung up to a vertical position, from which latter position, however, the tongue may be lifted out from between the plates $o$ when it is desired, for example, to carry the truck from one floor to another in an elevator on which there is not room enough to permit the tongue to rest in a horizontal position and where it would be dangerous to allow it to stand in a vertical position on account of its liability to fall and catch in the wall of the elevator-well. This tongue construction consists in providing the lower extremity thereof with a rearwardly-extending hook $r$, whereby a recess is provided in the curve of the hook for the bolt $q$ to engage in when the tongue is swung to substantially a horizontal position. On the front edge of the tongue, separated from said hook r by substantially the distance between the bolts p and q, there is provided a forwardly and downwardly inclined hook s, back of which is a downwardly and rearwardly inclined slot t, into the bottom of which the bolt p finds itself when the tongue is swung down to a draft position, as shown in Fig. 1.

From the position of the parts shown in Fig. 1 it is seen that the tongue n may swing vertically to a considerable extent without disengaging its lower end from the bolt p, on which, except when the tongue is in an almost horizontal position, the greater part of the strain will come.

It will be observed that the hook s projects outwardly beyond the edge of the tongue, and it will be remembered that it has been stated that the distance between the bolts p and q is substantially the same as the width of the tongue. It follows, therefore, that however carelessly the tongue may be dropped into its socket between these bolts the hook s will invariably engage the bolt p, and because of the formation of the latter the tendency of the tongue will be to tilt backward against the truck if it is not swung much forward of the vertical when it is dropped into the socket. The formation of the slot t behind this hook is such that when the tongue is swung downwardly the bolt p will not fail to bring up at the bottom of said slot, in which position the hook r will engage the bolt q, as shown in Fig. 1. It is seen, therefore, that the tongue n may be thrown from a horizontal position to the vertical with more or less carelessness and will tend to remain in the vertical position, from which it may be lifted out or dropped into its socket; but however carelessly it may be placed therein the hook s will always engage with the bolt p.

To give the proper strength to the hooks r and s, the sides of the lower part of the tongue may be shod with metal plates u.

By reason of the peculiar hook construction on the tongue the pins p and q will be engaged just as effectively for pushing the truck backward as they will be when it is being drawn forward.

Having thus described my invention, what I claim, and desire to secure by Letters Patent of the United States, is—

1. The combination with the axle of a truck, of a saddle for said axle constituting a truss-brace therefor, a tongue-socket on said saddle having two parallel side plates, two pins located transversely of said plates between which the end of the tongue may be inserted, and a removable tongue provided with oppositely-inclined hooks, whereby when said tongue is dropped to a substantially horizontal position, said hooks may engage respectively the upper side of one of said pins, and the lower side of the other.

2. In a truck, a removable tongue having two oppositely-inclined hooks located respectively on opposite sides of the tongue, an axle, two pins supported on the axle between which the tongue may be inserted from a vertical position, whereby when the latter is swung downward, the hooks may engage respectively with the under side of one and the upper side of the other of said pins, whereby one of said pins may be engaged by the tongue when the latter is drawn forward, and the other engaged when the tongue is moved in an opposite direction.

3. In a truck, a removable tongue having two oppositely-inclined hooks one of which extends beyond the plane of that side of the tongue on which it is located, an axle, two pins suitably supported thereon parallel therewith between which the end of the tongue may be inserted when the latter is in a vertical position, and on one of which said projecting hook may engage to support the tongue, there being a slot in the tongue back of said hook for receiving said pin when the tongue is drawn forward in a horizontal position.

4. In a truck, an axle, a tongue-socket for receiving the lower end of the tongue, a pin extending transversely of said socket parallel with the axle, a removable tongue the lower end of which may be inserted in said socket back of said pin; a hook on the forward side of said tongue and extending beyond the plane of said side whereby it may engage said pin, there being in the tongue back of said hook a downwardly and rearwardly inclined slot, the bottom of which may engage said pin when the tongue is drawn forward in a substantially horizontal position, and the hook thereby drawn away from the pin, and a suitable stop in the socket located above the rear end of the tongue.

CHARLES KOEGEL.

Witnesses:
WM. H. CHAPIN,
FRED KOEGEL.